C. A. CADWELL.
ELECTRIC WELDING APPARATUS.
APPLICATION FILED NOV. 25, 1916. RENEWED JUNE 17, 1918.

1,290,903.

Patented Jan. 14, 1919.
3 SHEETS—SHEET 3.

INVENTOR
Charles A Cadwell
BY Gray, Ohlin & Gray
ATTORNEYS

UNITED STATES PATENT OFFICE.

CHARLES A. CADWELL, OF CLEVELAND, OHIO, ASSIGNOR TO THE ELECTRIC RAILWAY IMPROVEMENT COMPANY, OF CLEVELAND, OHIO, A CORPORATION OF OHIO.

ELECTRIC WELDING APPARATUS.

1,290,903.  Specification of Letters Patent.  Patented Jan. 14, 1919.

Application filed November 25, 1916, Serial No. 133,347. Renewed June 17, 1918. Serial No. 240,528.

*To all whom it may concern:*

Be it known that I, CHARLES A. CADWELL, a citizen of the United States, and a resident of Cleveland, county of Cuyahoga, and State of Ohio, have invented a new and useful Improvement in Electric Welding Apparatus, of which the following is a specification, the principle of the invention being herein explained and the best mode in which I have contemplated applying that principle, so as to distinguish it from other inventions.

The present apparatus constitutes an improvement in the apparatus disclosed in my pending application filed June 19, 1915, Serial No. 35,081. As in such pending case, one of the objects of the present invention is to provide an apparatus whereby a current of relatively high voltage may be utilized, so that, for example, in welding, brazing, or otherwise homogeneously uniting rail bonds onto rails, current of the voltage regularly used in the operation of an electric railway may be taken directly from the trolley without requiring the interposition of a transformer. Heretofore, in operations of this sort, it has been found necessary to utilize an electrode of high resistance material, bringing the same to the proper high temperature by passing therethrough a current of relatively low voltage and large amperage. By the present process, however, instead of relying upon the resistance of such an electrode, I utilize the electric arc which, as is well understood, will conduct a considerably higher voltage than that just indicated for such resistance electrode.

In employing the electric arc, however, in welding operations, particularly where the bodies are of unlike mass, and where in addition there may be a disparity in the temperatures of fusion, the smaller mass, for example, having both the lower temperature of fusion and the greater heat conductivity, an ordinary arc, as is well understood, cannot be successfully employed, as it will fuse or burn such smaller body long before the contacting face of the larger body is brought to a welding temperature; or at least if the parts are welded together at all, they are thus united only at a few points instead of uniformly throughout their contact surfaces, as is desirable, particularly in a rail-bonding operation, where the object is to provide an adequate and at the same time permanent electrical connection across the joint between two rails.

The object of the present invention, accordingly, is to provide an apparatus for so regulating and controlling the heating effect of the arc as to affect uniformly a considerable area, and thus enable, for example, a bond terminal and adjacent face of the rail, wherewith it is in contact, to be brought practically simultaneously to a proper welding or brazing temperature. A further object is to render such apparatus so simple and compact that it may be readily carried about and may be quickly set up for use where desired, without interfering to any serious extent with the use of the rails for traction purposes.

To the accomplishment of the foregoing and related ends, the invention, then, consists of the means hereinafter fully described and particularly pointed out in the claims, the annexed drawings and the following description setting forth in detail certain mechanism embodying the invention, which, however, constitutes but several of the various ways in which the principle of the invention may be used.

In said annexed drawings:—

Fig. 6$^a$ is another section taken on the plane indicated by the line 6$^a$—6$^a$, Figs. 3 and 4; Figs. 8 and 9 are elevational views, similar to Fig. 1, but showing the apparatus in different positions, respectively.

Figures 1, 7:
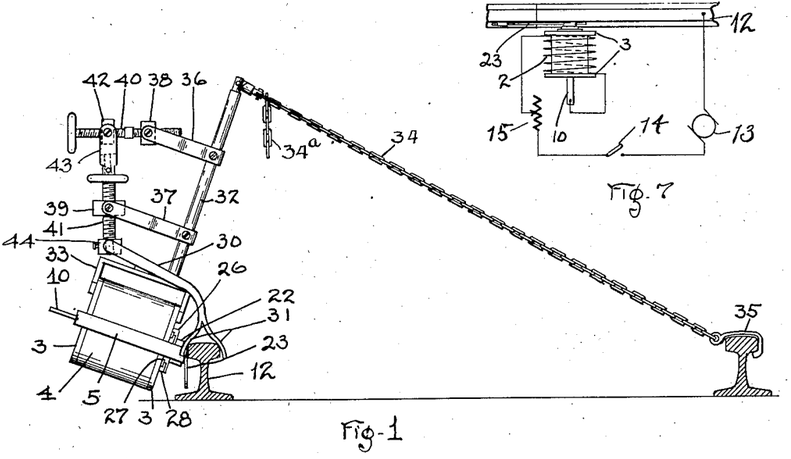
Figure 1 is a side elevational view of an apparatus embodying my present improvements, more especially as designed for the operation of applying bonds to rails.
Fig. 7 is a diagrammatic illustration of the apparatus showing the circuit connections therefor.
Figure 2:
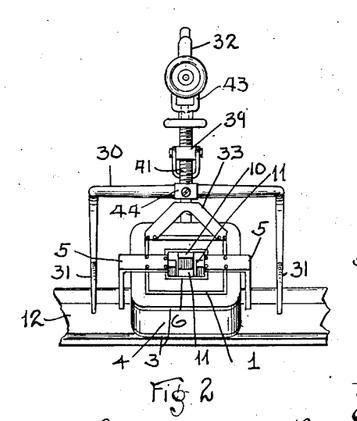
Fig. 2 is a rear elevational view of such apparatus.

The construction of the welding or heating device proper, which is best shown in the detail sectional views in Figs. 3 to 6 inclusive, will conveniently precede a description of the supporting means provided in connection with the particular use in contemplation, such supporting means being shown in Figs. 1 and 2.

Figure 3:
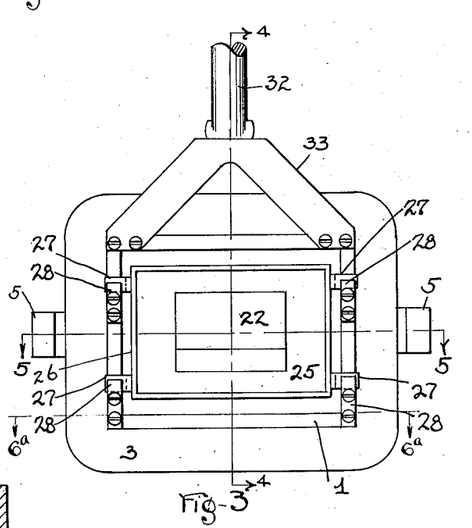
Fig. 3 is a front elevational view thereof on a somewhat larger scale.
Figure 4:
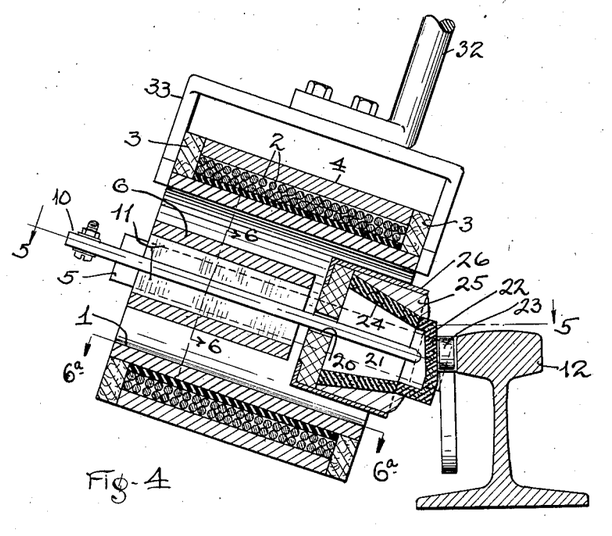
Fig. 4 is a vertical longitudinal section of said apparatus, the plane of the section being indicated by the line 4—4, Fig. 3.
Figure 5:
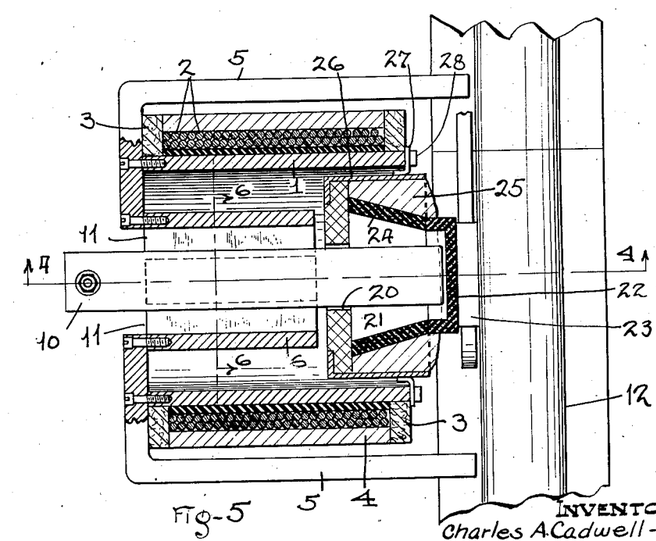
Fig. 5 is a horizontal section, the plane of the section being indicated by the line 5—5, Figs. 3 and 4.
Figure 6:
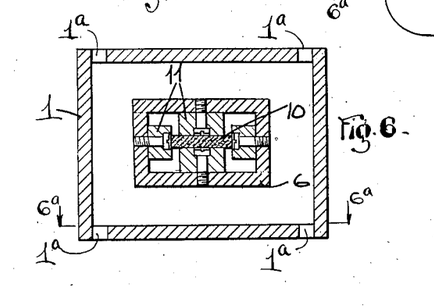
Fig. 6 is a transverse section of a portion of the apparatus as indicated by the line 6—6, Figs. 4 and 5.

The main structural element in the heating device proper is a hollow metal core 1 preferably made out of wrought-iron and of the oblong rectangular form in cross-section shown in Fig. 3. As indicated in Figs. 6 and 6ª, such core is cut away or formed with longitudinal recesses 1ª at its respective corners, so as to separate the top, bottom and sides from each other save near their respective front and rear ends. Surrounding such core 1 is a coil 2 consisting of a heavy conductor wound in the form of a helix, or rather two superimposed helices in the specific embodiment illustrated, such coil preferably extending from near the front end of the core to a point a trifle short of its rear end. Flanges 3 of non-conducting, heat-resisting material, such as asbestos board, bound the ends of the coil, which is further inclosed in a protective shell or casing 4, which may be of similar material, as shown in Figs. 4 and 5, or may be a perforated metal shell in order to give ventilation.

Attached by means of set screws or the like to opposite sides of core 1 at its rear end are two similar angular arms 5 of soft iron, the lateral portions of which are disposed alongside of the coil 2 and approximately parallel therewith, extending some distance forwardly of the device as a whole. The extreme inner ends of the rear portions of such arms which are thus attached to the core are similarly attached to and serve to support an inner metal core 6 of the same material as the outer one, which is spaced a slight distance from the latter and terminates some distance short of the front end thereof. To all intents and purposes, so far as operation is concerned, it will be understood that the two cores 1 and 6, with the aforesaid arms 5, are an integral structure, lying in the magnetic circuit of the coil and influencing the effect of the latter on the arc, which constitutes the source of heat in a fashion which will be more fully described later.

It should be noted that the construction of the electro-magnetic apparatus proper, just described above, forms the subject matter of a separate application filed February 21, 1918, Serial No. 218,472, claims to such apparatus having been required to be divided out of the present case.

One of the members between which such arc is established is an electrode consisting of a rod or bar 10 of graphite that is slidably supported in the inner core 6 by means of blocks 11 of asbestos composition, or similar non-conducting, heat-resisting material. The coil 2 is preferably included in series with such electrode, the arrangement of the circuit being diagrammatically shown in Fig. 7, where the return, it will be observed, is through the rail 12 to the generator 13, which is illustrated as of D. C. type. A suitable switch 14 will of course be included in the circuit at a point convenient to the apparatus, as also a resistance 15 of any suitable construction, whereby the voltage may be brought down and regulated as desired, the apparatus being designed to take from one-fourth to one-third of the voltage received from the service line. The electrode will also be provided at its rear end with a suitable handle (not shown), whereby it may be advanced or retracted as occasion may demand.

The forward end of such electrode 10 extends through an aperture 20 in the rear wall of a heat-conserving or furnace chamber 21, separate from the apparatus thus far described, the rear wall of such chamber consisting of a block of magnesite, or the like, while the front wall consists of a graphite block or plate 22, that is adapted to press against the article (e. g. the bond 23) to be welded, or heated for any other purpose, and constitutes at the same time the member between which and such electrode 10 the arc is formed. This plate constitutes a separable section of a shell 24 of the same material, of generally cylindrical or, more accurately, of frusto-pyramidal form, that constitutes a lining for the side walls of the chamber 21, the plate being removably attached to such shell in any suitable fashion, either by mechanical means or otherwise. Preferably, however, it is simply cemented onto such shell, by being surrounded by a layer 25 of highly refractory, non-conducting material, such as a mixture of silica and clay. The latter also surrounds the shell proper, being packed tightly between the same and a light metallic casing 26.

Such casing, in addition to reinforcing shell 24, also serves to support the chamber as a whole, inside of the outer core 1 and just in front of the inner core 6, through the medium of laterally projecting lugs 27, two on each side as shown, that are adapted to engage behind projections 28 carried by the front end of said outer core, as a matter of convenience. The form and disposition of these projections is such that the casing 26 and chamber 21 as a whole may be readily slipped into place, or removed as desired. It is thus possible to easily and quickly change one chamber for another, should this become desirable through the breakage of the graphite shell 22 or otherwise. The contacting portion 22 of the latter, as previously described, may be replaced and the chamber thus quickly rendered fit for service again by the renewal of this portion only. It will also be obvious that by reason of the manner in which the chamber is supported, as just described, the latter is substantially entirely clear of the rest of the apparatus on all sides, save for the small supporting lugs. Thus, while some heat may be radiated from the walls of the chamber, it is not conducted directly to the adjacent parts of the apparatus, this being highly undesirable.

The apparatus, in the specific form illustrated, as has already been explained, is specially designed for welding bonds onto rails. When used for this purpose the heating device proper will be desirably supported adjacent the rail to be bonded, and at a slight angle thereto, as indicated in Figs. 1 and 4, the contacting face 22 of the graphite shell being correspondingly inclined to bear squarely against the bond terminal.

For thus supporting the device, the apparatus shown in Figs. 1 and 2 has been especially designed and found entirely satisfactory. A yoke member 30, having its respective ends 31 forked to engage the rail head, stands upwardly over the device in its operative position, such device being attached thereto in the following manner.

A rod 32 is rigidly fixed by means of a bracket 33, or otherwise, to the outer core 1, or other available part of the device, forming part of an elongated handle for the latter. To the upper end of this rod, or upwardly extending arm, is attached a chain 34, or equivalent member, preferably flexible like a chain, that is provided with a hook 35 or the like for attachment to the other rail, or some similar fixed object. Said rod 32 is also provided with two rearwardly projecting arms 36 and 37 having interiorly threaded members or nuts 38 and 39 swiveled to their outer ends, respectively. In such nuts are threaded adjusting screws 40 and 41, respectively. These screws lie at approximately right angles to each other and are connected together through the medium of a swivel block 42, in which a reversely threaded portion of the horizontal screw 40 engages, such block being held in a forked member 43 rotatably secured to the upper end of the vertically disposed screw 41. The lower end of the latter is in turn similarly rotatably secured in a block 44 fixedly secured on the horizontal portion of the yoke 30.

The rod 32, from which the welding device proper is thus in effect suspended, and the yoke 30, along with screw 41, it will be observed cross each other like the two members of a pair of shears, being pivotally connected together at points intermediate of their ends through the medium of arm 37 and nut 39. Accordingly, when the forked lower ends 31 of the yoke are in engagement with the rail 12, not only is the welding device supported thereby upon such rail, but, by drawing the upper ends of rod 32 and screw 41 toward each other, said device will be moved toward the lower ends of the yoke, and thus toward the rail. Vice versa, when the upper ends of such shear-like members are moved apart, the device will be correspondingly moved away from the rail.

The movement just referred to is obtained by rotation of the horizontal screw 40 through the hand-wheel thereon, and, depending upon the direction of such rotation, will serve to swing the device in or out in a generally horizontal direction, and thus to press the contact plate 22 against the bond terminal with such force as may be required, or else withdraw said plate, so as entirely to clear such terminal. At the same time, by reason of the adjustable character of the connection between the rod 32 and the screw 41, the arm 37 being movable along said screw upon rotation of the latter, as already described, the elevation of the device may be varied so that such horizontal movement of the same will bring the plate 22 into proper contact with the bond wherever the latter may be located. Moreover, the angular position of the rod 32, with respect to the perpendicular, may be varied by lengthening or shortening the chain 34 through the medium of the extra links 34ª, or any other equivalent fashion, so as to correspondingly tilt the axis of the heating device at whatever elevation the latter may be thus supported. In this way the angular disposition of the contact face of the graphite shell may be varied or adjusted to conform in its inclination with the surface to which it is to be applied.

Figures 6A, 8:
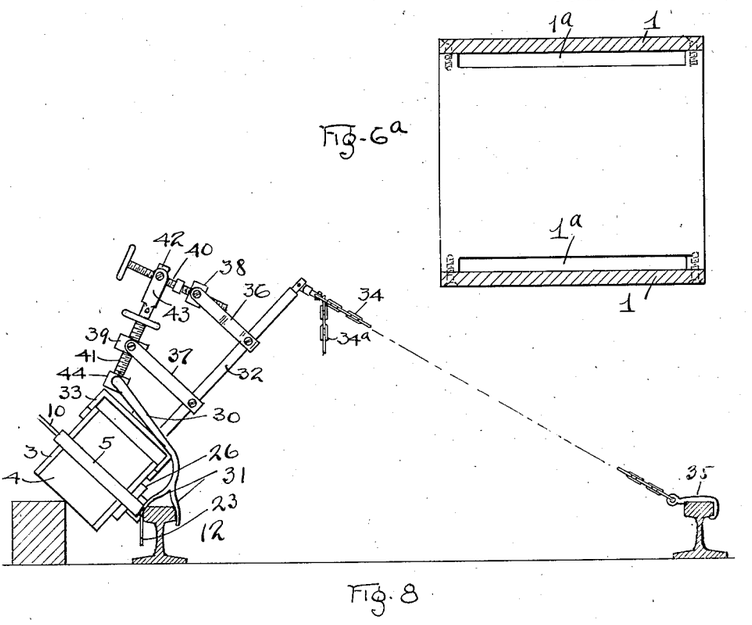
Figure 9:
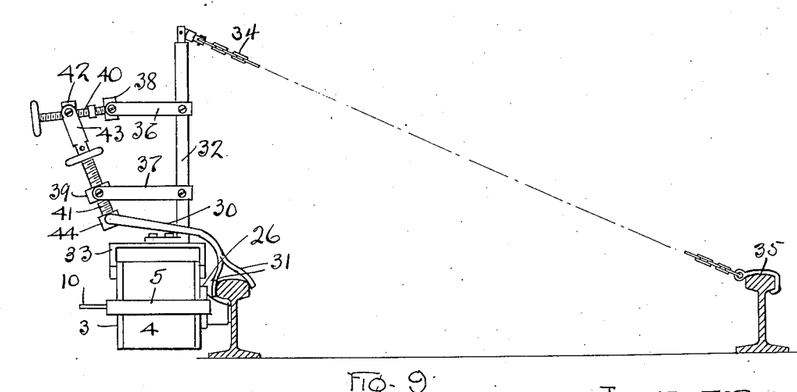

An idea of the different positions which the apparatus may be made to assume, by means of the foregoing adjustments, may be derived from Figs. 8 and 9, the first of which shows the device tilted to clear a guard timber such as frequently encountered in bridges and in like situations, the second of which shows the device in position for bonding the web of a rail.

Not only are the necessary adjustments for the apparatus when in use thus rendered extremely simple and easy to make, but it will also be observed that the entire apparatus is supported from the rails. Since the latter always occupy a fixed relation to each other, and moreover afford a solid foundation, it will obviously be much more satisfactory to set up the apparatus in hand than an apparatus which is partly supported from the track bed, which is of varying slope and affords only an uncertain footing.

In order to move the apparatus it is merely necessary to pick it up and carry it from the scene of one operation to another, the size and weight being such that this is easily done by one man single-handed. The bond is either temporarily supported by suitable means provided for the purpose, or is held by one hand, while the screws 40 and 41 are adjusted until the contact face of the graphite shell bears against the bond terminal with sufficient force to hold the same in place. The degree of pressure may be varied, while the heating operation is in progress, by rotating the horizontal screw in one direction or the other, and a satisfactory weld or braze thus insured. By reason of the unique construction of the heating device proper, including not merely two cores, one within the other, the inner core being shorter than the outer one, but also the angular bars 5 connecting the rear ends of such cores and lying alongside the coil 2 after the fashion of the arms of a magnet, a magnetic field is established, when a current is passed through the coil, that serves to direct and control the arc so as to steady the same and insure a uniform heating of the entire front face of the graphite block. Such arc is spread mostly in a horizontal direction, corresponding with the longer diameter of the device, and so distributes the heat lengthwise of the bond terminal, which is usually of elongated form, and fuses the latter throughout its entire course. The heating chamber 21 in which the arc is formed is not only a separable part of the apparatus, thereby presenting advantages previously noted, but also is spaced apart from the rest of the apparatus in such fashion as to prevent the conduction of heat to the coil and other parts which surround the heating chamber as far as possible.

Finally, it should be observed that the device in all of its adjusted positions remains freely oscillatory about the screw 41 as a vertical axis. The contact-plate 22 thus automatically accommodates itself to the angular disposition (in a horizontal plane) of the bond to be operated on, and in this way insures a uniform pressure, which is very important.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In apparatus of the character described, the combination of a heat-distributing plate adapted to contact with the article to be heated; means for directing an arc against said plate; and means for spreading such arc over the surface of said plate, said means including an electro-magnetic coil disposed with its axis in substantial alinement with such arc; a core for said coil; and arms connected with the rear end of said core and lying alongside of said coil.

2. In apparatus of the character described, the combination of a heat-distributing plate adapted to contact with the article to be heated; means for directing an arc against said plate; and means for spreading such arc over the surface of said plate, said means including an electro-magnetic coil disposed with its axis in substantial alinement with such arc; a tubular core for said coil; and arms connected with the rear end of said core and lying alongside of said coil.

3. In apparatus of the character described, the combination of a heat-distributing plate adapted to contact with the article to be heated; means for directing an arc against said plate; and means for spreading such arc over the surface of said plate, said means including an electro-magnetic coil disposed with its axis in substantial alinement with such arc; two similarly disposed tubular cores within such coil; and two angular arms connected with said cores and lying alongside of said coil.

4. In apparatus of the character described, the combination of a heat-distributing plate adapted to contact with the articles to be heated; means for directing an arc against said plate; and means for spreading such arc over the surface of said plate, said means including an electro-magnetic coil disposed with its axis in substantial alinement with such arc; two similarly disposed tubular cores within such coil, one such core lying within and spaced from the other; and two angular arms connected with the rear ends of said cores and lying alongside of said coil.

5. In apparatus of the character described, the combination of a heat-distributing plate adapted to contact with the article to be heated; an electrode adjustable toward and from said plate and adapted to direct an arc thereagainst; an electro-magnetic coil concentric with said electrode but lying to the rear of said plate; a tubular core within said coil approximately co-extensive therewith; a second tubular core lying within, spaced from, and terminating short of the front end of said first core; and two angular arms connected with the rear ends of said cores and lying alongside of said coil.

6. In apparatus of the character described, the combination of a heat-distributing plate adapted to contact with the article to be heated; means for directing an arc against said plate; and means for spreading such arc over the surface of said plate, said means including an electro-magnetic coil disposed with its axis in substantial alinement with such arc; and a shell, forming a heating chamber, supported clear of said core and coil, said plate being carried by said shell.

7. In apparatus of the character described, the combination of a heat-distributing plate adapted to contact with the article to be heated; an electrode adjustable toward and from said plate and adapted to direct an arc thereagainst; an electro-magnetic coil concentric with said electrode but lying to the rear of said plate; a tubular core within said coil approximately co-extensive therewith; a second tubular core lying within, spaced from, and terminating short of the front end of said first core, and a shell, forming a heating chamber, supported clear of both said cores and coil, said plate being carried by said shell.

8. In apparatus of the character described, the combination of a heat-distributing plate adapted to contact with the article to be heated; an electrode adjustable toward and from said plate and adapted to direct an arc thereagainst; an electro-magnetic coil concentric with said electrode but lying to the rear of said plate; a tubular core within said coil approximately co-extensive therewith; a second tubular core lying within, spaced from, and terminating short of the front end of said first core, and a shell, forming a heating chamber, detachably supported within said core but clear both of said core and coil, said plate being carried by said shell.

9. In apparatus of the character described, the combination of a heat-distributing plate adapted to contact with the article to be heated; an electrode adjustable toward and from said plate and adapted to direct an arc thereagainst; an electro-magnetic coil concentric with said electrode but lying to the rear of said plate; a tubular core within said coil approximately co-extensive therewith; a second tubular core lying within, spaced from, and terminating short of the front end of said first core, and a shell, forming a heating chamber, detachably supported within said first core and in front of said second core, said shell being thus supported clear of both said cores and said plate being carried by said shell.

10. In apparatus of the character described, the combination of a heat-distributing plate adapted to contact with the article to be heated; an electrode adjustable toward and from said plate and adapted to direct an arc thereagainst; and a heat-conserving chamber surrounding such arc, said chamber including a carbon shell closed at one end by said heat-distributing plate, and a plate of refractory material closing the other end of said shell.

11. In apparatus of the character described, the combination of a heat-distributing plate adapted to contact with the article to be heated; an electrode adjustable toward and from said plate and adapted to direct an arc thereagainst; and a heat-conserving chamber surrounding such arc, said chamber including a carbon shell closed at one end by said heat-distributing plate, a plate of refractory material closing the other end of said shell, and a layer of similar material laterally inclosing said shell.

12. In apparatus of the character described, the combination of a heat distributing plate adapted to contact with the article to be heated; an electrode adjustable toward and from said plate and adapted to direct an arc thereagainst; and a heat-conserving chamber surrounding such arc, said chamber including a carbon shell closed at one end by said heat-distributing plate, a layer of similar material laterally inclosing said shell, and a metallic casing for the whole.

13. In apparatus of the character described, the combination of a heat-distributing plate adapted to contact with the article to be heated; an electrode adjustable toward and from said plate and adapted to direct an arc thereagainst; and a heat-conserving chamber surrounding such arc, said chamber including a graphite shell closed at one end by said heat-distributing plate, a plate of magnesite closing the other end of said shell, a layer of silica and clay packed around said shell and serving to attach said heat-distributing plate thereto, and a metallic casing for the whole.

14. In apparatus of the character described, a heat-distributing plate adapted to form one pole of an electric arc, said plate being recessed on the side against which such arc is directed.

15. In apparatus of the character described, a heat-distributing plate adapted to form one pole of an electric arc, said plate having one face shaped to fit the article to be heated and having its opposite side recessed.

16. In apparatus for bonding rails, or the like, the combination with a heating device including a plate adapted to contact with a bond terminal; of means adapted to support said device with said plate in such contacting position, said means including a member attached to said device and adapted to engage and rest upon the rail being operated on.

17. In apparatus for bonding rails, or the like, the combination with a heating device including a plate adapted to contact with a bond terminal; of means adapted to support said device with said plate in such contacting position, said means including a member attached to said device and adapted to oscillatorily engage and rest upon the rail being operated on.

18. In apparatus for bonding rails, or the like, the combination with a heating device including a plate adapted to contact with a bond terminal; of means adapted to support said device with said plate in such contacting position, said means including a member adapted to engage and rest upon the rail being operated on, said device being pivotally attached to said member about an axis approximately parallel with such rail.

19. In apparatus for bonding rails, or the like, the combination with a heating device including a plate adapted to contact with a bond terminal; of means adapted to support said device with said plate in such contacting position, said means including a member adapted to oscillatorily engage and rest upon the rail being operated on, said device being pivotally attached to said member about an axis approximately parallel with such rail.

20. In apparatus for bonding rails, or the like, the combination with a heating device including a plate adapted to contact with a bond terminal; of means adapted to support said device with said plate in such contacting position, said means including a member adapted to engage and rest upon the rail being operated on, said device being pivotally attached to said member about an axis approximately parallel with such rail and being also oscillatory about a rectangularly related axis.

21. In apparatus for bonding rails, or the like, the combination with a heating device including a plate adapted to contact with a bond terminal; of means adapted to support said device with said plate in such contacting position, said means including a yoke-member, an upwardly extending arm on said device, and angularly related, interconnected screws securing said arm to said yoke.

22. In apparatus for bonding rails, or the like, the combination with a heating device including a plate adapted to contact with a bond terminal; of means adapted to support said device with said plate in such contacting position, said means including a yoke-member, an upwardly extending arm on said device, two laterally extending arms on said upwardly extending arm, a horizontal screw engaging one of said lateral arms, and an inter-connected vertical screw engaging the other lateral arm and also said yoke member.

23. In apparatus for bonding rails, or the like, the combination with a heating device including a plate adapted to contact with a bond terminal; of means adapted to support said device with said plate in such contacting position, said means including a member attached to said device and adapted to engage and rest upon the rail being operated on; an upwardly extending arm on said device; and a member extending from said arm and formed to engage the opposite rail, or similar fixed object.

24. In apparatus for bonding rails, or the like, the combination with a heating device including a plate adapted to contact with a bond terminal; of means adapted to support said device with said plate in such contacting position, said means including a member attached to said device and adapted to engage and rest upon the rail being operated on; and means adjustable in length for connecting said device with the opposite rail, or similar fixed object.

25. In apparatus for bonding rails, or the like, the combination with a heating device including a plate adapted to contact with a bond terminal; of means adapted to support said device with said plate in such contacting position, said means including a member adjustably attached to said device, whereby the latter may be raised and lowered relatively to the former, said member being adapted to engage and rest upon the rail being operated on; and means for connecting said device with the opposite rail, or similar fixed object.

26. In apparatus for bonding rails, or the like, the combination with a heating device including a plate adapted to contact with a bond terminal; of means adapted to support said device with said plate in such contacting position, said means including a member adjustably attached to said device, whereby the latter may be both raised and lowered and moved horizontally with respect to the former; and means for connecting said device with the opposite rail, or similar fixed object.

27. In apparatus for bonding rails, or the like, the combination with a heating device including a plate adapted to contact with a bond terminal; of means adapted to support said device with said plate in such contacting position, said means including a member attached to said device and adapted to oscillatorily engage and rest upon the rail being operated upon; and means, adjustable in length, for connecting said device with the opposite rail, or similar fixed object.

28. In apparatus for bonding rails, or the like, the combination with a heating device including a plate adapted to contact with a bond terminal; of means adapted to support said device with said plate in such contacting position, said means including a member adjustably attached to said device and adapted to oscillatorily engage and rest upon the rail being operated on; an upwardly extending arm on said device; and a flexible member extending from said arm and provided with a hook adapted to engage the opposite rail, or similar fixed object.

29. In apparatus for bonding rails, or the like, the combination with a heating device including a plate adapted to contact with a bond terminal; of means adapted to support said device with said plate in such contacting position, said means including a yoke member having ends adapted to oscillatorily engage and rest upon the rail being operated on; an upwardly extending arm on said device; angularly related, inter-connected screws adjustably securing said arm to said yoke; and a flexible member, adjustable in length, extending from said arm and provided with a hook adapted to engage the opposite rail, or similar fixed object.

30. In apparatus for bonding rails, or the like, the combination with a heating device including a plate adapted to contact with a bond terminal; of means adapted to support said device with said plate in such contacting position, said means including a yoke member having ends adapted to oscillatorily engage and rest upon the rail being operated on; an upwardly extending arm on said device; two laterally extending arms on said upwardly extending arm; a horizontal screw engaging one of said lateral arms and an inter-connected vertical screw engaging the other lateral arm and also said yoke member; and a flexible member, adjustable in length, extending from said upwardly extending arm and provided with a hook adapted to engage the opposite rail, or similar fixed object.

31. In apparatus of the character described, the combination of a heat-distributing plate adapted to contact with the article to be heated; means for directing an arc against said plate; and means for spreading such arc over the surface of said plate, said means including an electro-magnetic coil disposed with its axis in substantial alinement with such arc; and a tubular core for said coil, said core being longitudinally recessed or cut away in places substantially as described.

32. In apparatus of the character described, the combination of a heat-distributing plate adapted to contact with the article to be heated; means for directing an arc against said plate; and means for spreading such arc over the surface of said plate, said means including an electro-magnetic coil disposed with its axis in substantial alinement with such arc; and a tubular core for said coil, said core being formed with longitudinal recesses or slots extending from near one end to near the other.

33. In apparatus of the character described, the combination of a heat-distributing plate adapted to contact with the article to be heated; means for directing an arc against said plate; and means for spreading such arc over the surface of said plate, said means including an electro-magnetic coil disposed with its axis in substantial alinement with such arc; and a tubular core for said coil, said core being of general rectangular form in cross-section and formed adjacent its respective corners with recesses or slots extending from near one end to near the other.

34. A support for a rail-welding device, or the like, comprising crossed members pivotally connected together at points intermediate of their ends, such device being carried by one end of one of said members and the corresponding end of the other member being adapted to engage the work to be operated upon.

35. A support for a rail-welding device, or the like, comprising crossed members pivotally connected together at points intermediate of their ends, such device being carried by one end of one of said members and the corresponding end of the other member being adapted to engage the work to be operated upon; and means adapted to move the other ends of said members toward and from each other.

36. A support for a rail-welding device, or the like, comprising crossed members, such device being carried by one end of one of said members and the corresponding end of the other member being adapted to engage the work to be operated upon; and means adjustably pivotally connecting said members together at points intermediate of their ends.

37. A support for a rail-welding device, or the like, comprising crossed members, such device being carried by one end of one of said members and the corresponding end of the other member being adapted to engage the work to be operated upon; means adjustably pivotally connecting said members together at points intermediate of their ends; and means adapted to move the other ends of said members toward and from each other.

38. A support for a rail-welding device, or the like, comprising crossed members, such device being carried by one end of one of said members and the corresponding end of the other member being adapted to engage the work to be operated upon; and means adjustable longitudinally of one of said members and pivotally connecting the latter together at points intermediate of their ends.

39. A support for a rail-welding device, or the like, comprising crossed members, such device being carried by one end of one of said members and the corresponding end of the other member being adapted to engage the work to be operated upon; means adjustable longitudinally of one of said members and pivotally connecting the latter together at points intermediate of their ends; and means adapted to move the other ends of said members toward and from each other.

40. A support for a rail-welding device, or the like, comprising crossed members pivotally connected together at points intermediate of their ends, such device being carried by the lower end of one of said members and the corresponding end of the other member being adapted to engage the work to be operated upon; and means for retaining said members in desired angular relation to the perpendicular.

41. A support for a rail-welding device, or the like, comprising crossed members pivotally connected together at points intermediate of their ends, such device being carried by the lower end of one of said members and the corresponding end of the other member being adapted to engage the work to be operated upon; means adapted to move the upper ends of said members toward and from each other; and means adapted to retain said members in desired angular relation to the perpendicular.

42. A support for a rail-welding device, or the like, comprising crossed members, such device being carried by the lower end of one of said members and the corresponding end of the other member being adapted to engage the work to be operated upon; means adjustably pivotally connecting said members together at points intermediate of their ends; means adapted to move the upper ends of said members toward and from each other; and means adapted to retain said members in desired angular relation to the perpendicular.

43. A support for a rail-welding device, or the like, comprising crossed members, such device being carried by the lower end of one of said members and the corresponding end of the other member being adapted to engage the work to be operated upon; means adjustable longitudinally of one of said members and pivotally connecting the latter together at points intermediate of their ends; means adapted to move the upper ends of said members toward and from each other; and means adapted to retain said members in desired angular relation to the perpendicular.

Signed by me, this 15 day of November, 1916.

CHARLES A. CADWELL.